(12) United States Patent
Keba (10) Patent No.: US 7,249,768 B2
(45) Date of Patent: Jul. 31, 2007

(54) SHAFT SEAL ASSEMBLY AND METHOD (75) Inventor: John E. Keba, Oak Park, CA (US)

(73) Assignee: United Technologies Corporation, Hartford, CT (US)

( * ) Notice: Subject to any disclaimer, the term of this patent is extended or adjusted under 35 U.S.C. 154(b) by 288 days.

(21) Appl. No.: 10/841,652

(22) Filed: May 7, 2004

(65) Prior Publication Data

US 2005/0248093 A1 Nov. 10, 2005

(51) Int. Cl.
F16J 15/34 (2006.01)
F16J 15/46 (2006.01)
(52) U.S. Cl. .................. 277/408; 277/427; 277/348
(58) Field of Classification Search ............. 277/348, 277/408, 401, 424, 427
See application file for complete search history.

(56) References Cited

U.S. PATENT DOCUMENTS

| | | | | | |
|---|---|---|---|---|---|
| 2,834,619 | A | * | 5/1958 | McNab | 277/317 |
| 2,873,986 | A | * | 2/1959 | Murray | 277/425 |
| 2,895,751 | A | * | 7/1959 | Standish | 277/401 |
| 3,034,797 | A | * | 5/1962 | Pike | 277/317 |
| 3,068,801 | A | * | 12/1962 | Murray | 415/109 |
| 3,395,645 | A | * | 8/1968 | Vilet | 277/424 |
| 3,410,565 | A | * | 11/1968 | Williams | 277/348 |
| 3,811,687 | A | * | 5/1974 | Honold et al. | 277/387 |
| 3,917,289 | A | * | 11/1975 | Ivanov et al. | 277/400 |
| 3,926,442 | A | * | 12/1975 | Muller | 277/348 |
| 4,199,152 | A | | 4/1980 | Catterfeld | |
| 4,641,842 | A | | 2/1987 | Kataoka | |
| 5,762,342 | A | * | 6/1998 | Kakabaker et al. | 277/306 |
| 6,135,458 | A | * | 10/2000 | Fuse | 277/401 |
| 6,311,983 | B1 | | 11/2001 | Burcham | |
| 6,494,460 | B2 | * | 12/2002 | Uth | 277/399 |

* cited by examiner

Primary Examiner—Alison K. Pickard
(74) Attorney, Agent, or Firm—Alston & Bird LLP (57) ABSTRACT A pressure-actuated shaft seal assembly and associated method for controlling the flow of fluid adjacent a rotatable shaft are provided. The seal assembly includes one or more seal members that can be adjusted between open and closed positions, for example, according to the rotational speed of the shaft. For example, the seal member can be configured to be adjusted according to a radial pressure differential in a fluid that varies with the rotational speed of the shaft. In addition, in the closed position, each seal member can contact a rotatable member connected to the shaft to form a seal with the rotatable member and prevent fluid from flowing through the assembly. Thus, the seal can be closed at low speeds of operation and opened at high speeds of operation, thereby reducing the heat and wear in the seal assembly while maintaining a sufficient seal during all speeds of operation.

34 Claims, 3 Drawing Sheets

SHAFT SEAL ASSEMBLY AND METHOD

FEDERALLY SPONSORED RESEARCH OR DEVELOPMENT

The invention described herein was made in the performance of work under NASA contract No. NAS8-01107 and is subject to the provisions of Section 305 of the National Aeronautics and Space Act of 1958 (72 Stat. 435; 42 U.S.C. 2457).

BACKGROUND OF THE INVENTION

1) Field of the Invention

This invention relates to seal assemblies and, in particular, to a pressure-actuated seal assembly for controlling the flow of a fluid along a shaft.

2) Description of Related Art

Various applications require the formation of a seal along a shaft or other rotatable member. For example, turbopumps that are used in rocket engines typically include a turbine and a pump that are connected by a shaft. The turbine is rotated by the flow of a fluid, thereby rotating the pump, which pumps another fluid. In some cases, it is desirable or necessary to separately maintain the fluids in the turbine and the pump. For example, leakage of a liquid from the pump can energetically react with fluid that is being used to rotate the turbine.

One or more seals are provided between the turbine and pump to control the flow of fluids therebetween or to overboard drains located between the pump and turbine. However, due to the high rotational speed of the components of the turbopump, contact between the stationary seals and the rotating shaft can result in excessive wear of the seals as well as the generation of heat that can negatively affect the performance or safety of the turbopump. Thus, lift-off seals can be provided between the turbine and the pump, each lift-off seal being configured to adjust between open and closed positions. In the closed position, the lift-off seal is biased by a spring against a surface of the shaft. The spring can be overcome by a pressurized fluid, e.g., from the pump or from an external source, to move the lift-off seal away from the surface of the shaft to the open position. Thus, at low speeds of operation, when the pressure in the pump is low, the spring maintains the lift-off seal in the closed position to limit the flow of fluid from the pump. During higher speeds of operation, when the pressure in the pump is higher, the lift-off seal is adjusted to the open position. Typically, migration of the fluid from the pump is at least partially prevented during higher speeds of operation by a non-contacting sealing mechanism. For example, a slinger connected to the shaft can define blades that extend radially outward therefrom to rotate the fluid at the pump side of the seal. The rotation of the fluid forces the fluid radially outward beyond the lift-off seal to prevent the fluid from leaking through the space opened between the lift-off seal and the shaft.

While conventional seals do provide some degree of sealing between such components as the turbine and pump of a turbopump, there exists a need for an improved seal and method for controlling the flow of fluids along a shaft. In particular, the seal should maintain a high degree of sealing, while also limiting the heat and wear that results from contact between sealing members at high speed operation.

SUMMARY OF THE INVENTION

The present invention provides a pressure-actuated shaft seal assembly and associated method for controlling the flow of fluid adjacent a rotatable shaft. The seal assembly includes one or more seal members that can be adjusted between open and closed positions, for example, according to the rotational speed of the shaft. Thus, the heat and wear in the seal assembly can be minimized during high speed operation, while a sufficient seal is maintained during both low and high speed operation.

According to one embodiment of the present invention, the seal assembly includes a first seal member that controls the flow of a fluid along the shaft in a direction between first and second fluid chambers. The first seal member extends circumferentially around the shaft so that the seal member and the shaft define a fluid passage therebetween. The seal member is adjustable in an axial direction between open and closed positions. In the open position, the seal member defines a space that fluidly connects the first fluid chamber to the passage. In the closed position, the seal member is configured to close the space to substantially seal the fluid passage and prevent the fluid from flowing from the first chamber of the assembly through the passage. For example, the first seal member in the closed position can be configured to axially contact a rotatable member connected to the shaft to thereby close the space connecting the first fluid chamber to the passage. The seal member is received at least partially by a housing that extends circumferentially around the shaft and between the first and second fluid chambers. The housing defines third and fourth fluid chambers on opposite sides of a portion of the first seal member. The third and fourth chambers are fluidly connected to first and second fluid sources, respectively, so that the seal member can be adjusted axially between the open and closed positions by a pressure differential between the first and second fluid sources. A spring or other bias member can be configured to bias the first seal member to the closed position.

According to one aspect of the invention, the fourth chamber is fluidly connected to the first fluid chamber and defined at least partially by a surface of the first seal member that is directed opposite the first chamber. Thus, fluid in the fourth chamber exerts a force to urge the seal member toward the first chamber. In addition, the third chamber can also be connected to the first chamber, with the third and fourth chambers connected to the first fluid chamber at dissimilar radial positions so that the pressure differential between the third and fourth chambers corresponds to a radial pressure gradient in the first fluid chamber. For example, a first port extending through the housing can connect the third chamber to the first chamber at a first radial position, and a second port extending through the seal member can fluidly connect the fourth chamber to the first chamber at a second radial position that is radially inward relative to the first radial position. Further, a slinger in the first chamber can be connected to the shaft and configured to rotate the fluid in the first chamber as the shaft rotates, thereby forming a radial pressure gradient in the first fluid chamber corresponding to a rotational speed of the shaft.

According to another aspect of the invention, the seal assembly also includes a second seal member extending circumferentially around the rotatable shaft and proximate to the shaft to define a fluid passage between the second seal member and the shaft. For example, the second seal member can define a surface that is directed toward the shaft and at least partially defines the fluid passage, the surface being disposed proximate to the shaft so that the barrier fluid flows through the passage at a limited flow rate when the second seal member is in the open position. The second seal member has a first side directed toward the first seal member and an opposite second side directed toward a step surface extending generally radially outward from the shaft. The second seal member is adjustable in an axial direction between open and closed positions so that in the open position the second side of the second seal member and the step surface define a space, and the second seal member in the closed position contacts the step surface to close the space.

A barrier fluid passage is disposed at the second side of the second seal member and selectively fluidly connected to a source of pressurized barrier fluid to transmit the barrier fluid to the second seal member. Thus, the second seal member can be adjusted to the open position by a pressure of the barrier fluid at the second side of the second seal member. For example, the second seal member can be adjusted in a direction toward the first seal member to the open position when the barrier fluid is provided to the second side of the second seal member at a predetermined minimum pressure. A spring or other bias member biases the second seal member toward the step surface so that the spring adjusts the second seal member to the closed position when the source of pressurized barrier fluid is disconnected from the barrier fluid passage. In the closed position, the space is closed so that the fluid passage between the second seal member and the shaft is substantially sealed to prevent fluid from flowing therethrough. The second seal member can be substantially rigid and configured to adjust between the open and closed positions without significant deformation. In addition, the housing defines a drain disposed between the first and second seal members to receive fluid from the passages of the seal members.

According to one method of the present invention, a first seal member is configured to be adjustable in an axial direction between open and closed positions. In the open position, the first seal member defines a space fluidly connecting the first fluid chamber to a fluid passage extending between the first seal member and the shaft. In the closed position, the seal member closes the space to substantially seal the fluid passage and prevent the fluid from flowing from the first chamber of the assembly through the passage. For example, the first seal member can be axially adjusted against a rotatable member connected to the shaft to close the space connecting the first fluid chamber to the passage. Fluid is selectively provided to third and fourth chambers on opposite sides of a portion of the first seal member to thereby adjust the first seal member axially between the open and closed positions. For example, the fluid from the first fluid chamber can be provided to the fourth fluid chamber so that the fluid in the fourth chamber exerts a force to urge the seal member toward the first chamber. The fluid from the first fluid chamber can also be provided to the third fluid chamber, with the fluid flowing to the third and fourth chambers from dissimilar radial positions in the first fluid chamber so that a pressure differential in the third and fourth chambers corresponds to a radial pressure gradient in the first fluid chamber. The fluid in the first fluid chamber can be rotated with the shaft to form a radial pressure gradient in the first fluid chamber corresponding to a rotational speed of the shaft.

According to one aspect of the method, a second seal member is adjustable in an axial direction between open and closed positions. The second seal member has a first side directed toward the first seal member and an opposite second side directed toward a step surface extending generally radially outward from the shaft. The second seal member is adjustable in the axial direction so that the second seal member in the open position defines a space between the second side of the second seal member and the step surface, and the second seal member in the closed position contacts the step surface to close the space. A source of pressurized barrier fluid is selectively fluidly connected to the second chamber to transmit the barrier fluid to the second seal member and thereby adjust the second seal member to the open position so that the barrier fluid flows through the passage between the second seal member and the shaft. A spring or other bias member biases the second seal member toward the step surface so that the second seal member is adjusted to the closed position when the source of pressurized barrier fluid is disconnected from the second chamber.

BRIEF DESCRIPTION OF THE DRAWINGS

The foregoing and other advantages and features of the invention, and the manner in which the same are accomplished, will become more readily apparent upon consideration of the following detailed description of the invention taken in conjunction with the accompanying drawings, which illustrate preferred and exemplary embodiments, but which are not necessarily drawn to scale, wherein.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
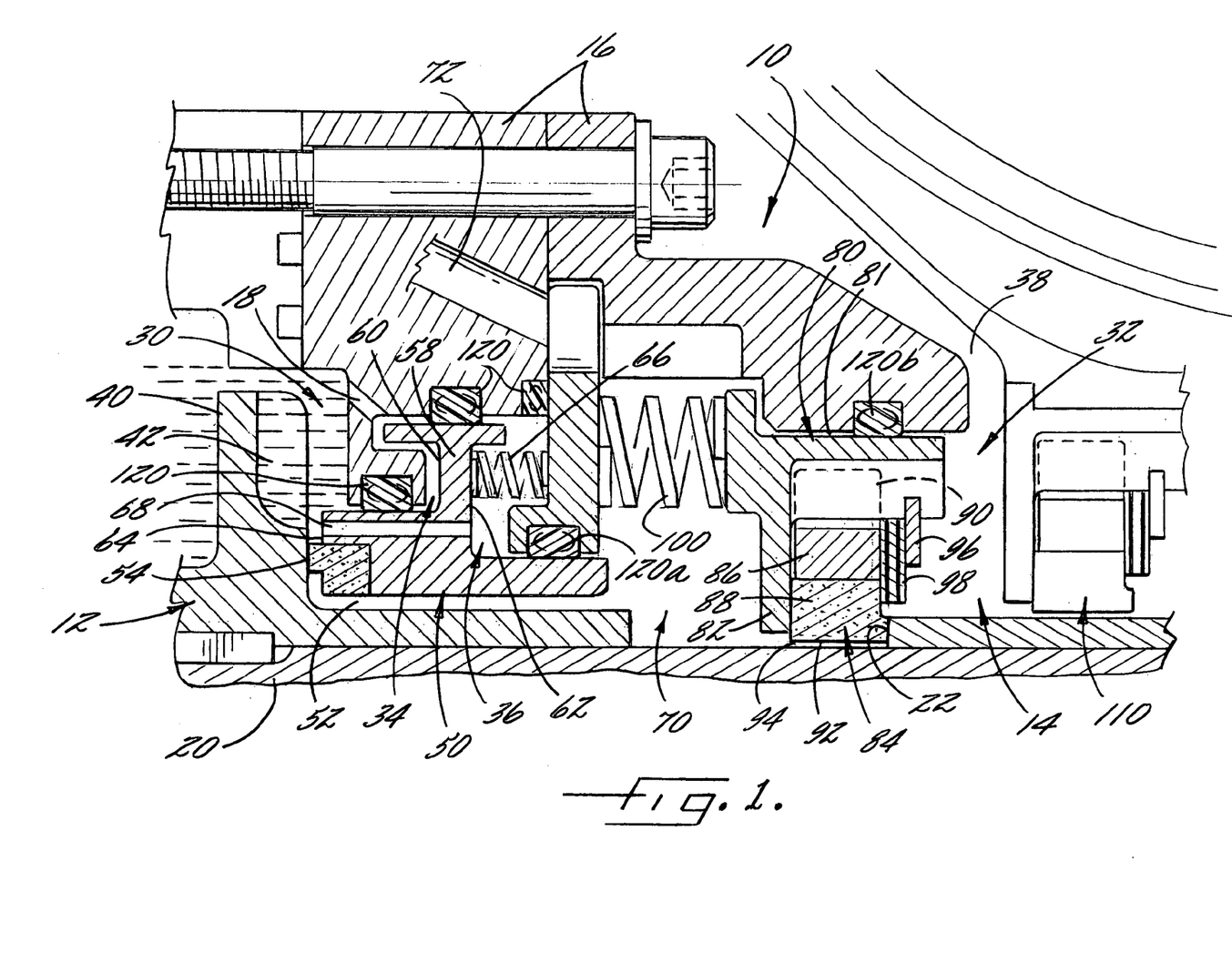
FIG. 1 is a section view illustrating a pressure-actuated shaft seal assembly for controlling the flow of fluids along a shaft according to one embodiment of the present invention, shown with first and second seal members in closed positions.

Referring to FIG. 1, there is shown a pressure-actuated shaft seal assembly 10 according to one embodiment of the present invention. The seal assembly 10 can be used for forming a seal between first and second sides 12, 14 of the seal assembly 10. For example, the seal assembly 10 can be used in a turbopump for a rocket engine with the first side 12 directed toward the pump and the second side 14 directed toward the turbine of the turbopump so that the seal assembly 10 maintains a fluid seal therebetween. Alternatively, the seal assembly 10 can be used in devices for various other applications, such as for forming seals between shafts, housings, or other components that relatively rotate or otherwise move in pumps, engines, turbines, and the like. Generally, the seal assembly 10 is used to controllably seal fluids, e.g., to selectively limit the flow of fluids between such components as the pump and turbine of the turbopump. It is appreciated that the seal assembly 10 is configurable according to the shape, configuration, and design requirements of a device that requires a full or partial fluid seal during various modes of operation of the device.

The seal assembly 10 includes a housing 16, which can be a unitary member or can be formed of a number of assembled portions. In either case, the housing 16 defines a bore therethrough for receiving a rotatable member, such as the shaft 20 that can mechanically connect the pump and turbine of a turbopump. The housing 16 is typically fixedly positioned relative to an outer housing of the turbopump, while the rotatable member 20, which extends in an axial direction through the seal assembly 10, can be rotated. A fluid can be provided on one or both sides 12, 14 of the seal assembly 10, and the seal assembly 10 generally controls the flow of the fluid(s) between the sides 12, 14 of the seal assembly 10. In the embodiment illustrated in FIG. 2, a fluid that is being pumped by the pump is provided at the first side 12 of the seal assembly 10 in a first chamber 30. The seal assembly 10 controls the flow of the fluid from the first chamber 30 and a second chamber 32 at the second side 14 of the seal assembly 10 to a drain 70.

A slinger 40 in the first chamber 30 is connected to the shaft 20 and configured to rotate with the shaft 20. Blades 42 of the slinger 40 extend radially outward from the shaft 20 and rotate the fluid in the first chamber 30 as the shaft 20 rotates. Thus, the slinger 40 forms a radial pressure gradient in the first fluid chamber 30 that corresponds to a rotational speed of the shaft 20. That is, as the rotational speed of the shaft 20 increases, an increasing pressure differential is established within the fluid in the first chamber 30, with higher pressures occurring at radial positions further from the shaft 20.

A first seal member 50 is disposed proximate to the first chamber 30 and configured to be selectively adjusted between open and closed positions. The seal member 50 extends circumferentially around the shaft 20, and the seal member 50 and shaft 20 define an annular passage 52 therebetween. In the closed position, the seal member 50 is adjusted toward the first chamber 30 so that a seal dam 54 contacts the slinger 40 to prevent fluid from the first chamber 30 from flowing through the passage 52. The seal dam 54 can be configured to form a seal with the slinger 40, and can be formed of a rigid, heat resistant material such as carbon. In the open position (FIG. 2), the seal member 50 is adjusted away from the slinger 40 so that the seal dam 54 and the slinger 40 define a space 56 therebetween. It is appreciated that the seal member 50 can alternatively be sealed against a different rotational member, such as a shoulder or sleeve on the shaft 20. In any case, the first seal member 50 can be closed when the shaft 20 is stationary or rotating at slow speeds to prevent the fluid from flowing from the first chamber 30 through the passage 52. At higher speeds of operation, the slinger 40 can rotate the fluid in the first chamber 30 at a sufficient speed so that the fluid is slung to the radially outward portion of the chamber 30, with little or no fluid at the radially inward portion of the chamber 30 proximate to the seal dam 54. Thus, the seal member 50 can be opened at higher operational speeds without significant flow of the fluid through the passage 52. Any fluid that does flow through the passage 52 can flow through the drain 70, from which the fluid is discharged through a drain passage 72 extending through the housing 16, e.g., to be vented to the environment or to be recirculated for reuse.

As shown in FIG. 1, the seal member 50 and housing 16 cooperatively define third and fourth chambers 34, 36, which are separated by a flange 58 of the seal member 50. The flange 58 defines opposite surfaces 60, 62, which are directed toward the respective chambers 34, 36. Thus, a pressure differential between the fluids in the third and fourth chambers 34, 36 tends to adjust the seal member 50 between the open and closed positions. The opposite surfaces 60, 62 of the flange 58 need not be equal in size. That is, the area of the surface 62 directed toward the fourth chamber 36 can be about equal to the sum of the area of the opposite surface 60 and a portion 64 of the seal member 50 that is exposed to the fluid in the first chamber 30 when the seal member 50 is closed. Further, a spring 66 or other mechanical bias member can be provided to bias the seal member 50 to the closed position.

As shown in FIG. 1, the seal member 50 can define a port 68 extending between a radially inward portion of the first chamber 30 and the fourth chamber 36 so that the pressure in the fourth chamber 36 is about equal to the pressure in the radially inward portion of the first chamber 30. The housing 16 can define a port 18 that extends between a radially outward portion of the first chamber 30 and the third chamber 34 so that the pressure in the third chamber 34 is about equal to the pressure in the radially outward portion of the first chamber 30. At low operational speeds, including when the shaft 20 is stationary, the pressure gradient in the first chamber 30 is zero or not substantial and the opposing fluid forces on the seal member 50 are about equal. The balance of pressure between the opposite sides of the seal member 50 is generally a result of an annular seal devices 120a being disposed at a radial position that is about the same as the seal dam 54. Thus, the spring 66 keeps the seal member 50 in the closed position so that fluid is prevented from flowing to the passage 52, regardless of the pressure of the fluid in the first chamber 30. At high operational speeds, the radial pressure gradient in the first chamber 30 increases so that the fluid delivered through the port 18 to the third chamber 34 is higher than the pressure of the fluid delivered through the port 68 to the fourth chamber 36. As the pressure differential in the chambers 34, 36 increases, and the imbalance of the resulting opposing fluid forces on the seal member 50 increases, the bias of the spring 66 is overcome and the seal member 50 is adjusted to the open position. Thus, the wear and heat associated with contact between the seal dam 54 and the slinger 40 at high operational speeds can be avoided or reduced by selectively opening the seal member 50. Further, it is appreciated that the opening and closing of the seal member 50 is determined in part by such parameters as the configuration of the ports 18, 68, the sizes of the chambers 30, 34, 36 and flange surfaces 60, 62, the configuration of the spring 66, and the like. Such parameters can be designed according to the desired operational aspects of the seal member 50 including the conditions under which the seal member 50 opens and closes.

While each of the third and fourth chambers 34, 36 is connected to the first fluid chamber 30 in the embodiment illustrated in FIG. 1, it is appreciated that the third and/or fourth chambers 34, 36 can alternatively be connected to other fluid sources. For example, the chambers 34, 36 can be connected to other fluid sources that provide pressures that vary with the speed of the shaft 20, such as a connection to the pumped fluid output of the pump. Generally, the third chamber 34 can be fluidly connected to a pressure source that varies with the speed of the shaft 20 so that the seal member 50 is adjusted to the open position when the speed of the shaft 20 increases. Additionally, or alternatively, the fourth chamber 36 can be fluidly connected to a pressure source that varies with the speed of the shaft 20 so that, although a change in speed of the shaft 20 may increase the pressure at the seal dam 54, the seal member 50 can be adjusted toward the first chamber 30 to the closed position with a relatively constant force regardless of the speed of the shaft 20. Alternatively, one or both of the fluid chambers 34, 36, can be connected to other fluid sources that are provided for independently controlling the adjustment of the seal member 50. For example, the fourth chamber 36 can be connected to the first chamber 30 as shown, and the port 18 can extend from the third chamber 34 to another fluid source that is provided for controlling the operation of the seal member 50 (See FIG. 3). Also, instead of the slinger 40, a clearance seal may be provided between fluid chambers 30, 70 to restrict flow in the open position.

The seal assembly 10 can include additional or alternate seal members, which can also be adjustable. In this regard, the seal assembly 10 of FIGS. 1 and 2 includes a second seal member 80 disposed between the drain 70 and the second chamber 32. The second seal member 80 includes a sub-housing 82 that extends circumferentially around the shaft 20. A ring seal 84 disposed in the sub-housing 82 includes outer and inner rings 86, 88. The outer ring 86 is connected to the sub-housing 82 by one or more tangs 90 that extend radially outward. The inner ring 88 is disposed within the outer ring 86 and connected thereto. The inner ring 88, which can be formed of a rigid, heat resistant material such as carbon, defines a surface 92 directed toward the shaft 20 and configured in close proximity to the shaft 20 to define a clearance fit. That is, the surface 92 does not contact the shaft 20 but is configured to define a passage 94 that is sufficiently small to restrict flow therethrough to a controlled rate. For example, the passage 94 can be sufficiently small to restrict the flow of the fluid therethrough to a predetermined rate for a given fluid pressure differential across the passage 94, or the passage 94 can be sufficiently small to establish a particular pressure differential across the passage 94 for a given flow rate. The seal ring 84 can be held in the sub-housing 82 by a retaining clip 96, and one or more wave-spring washers 98 can be provided between the seal ring 84 and the retaining clip 96 to secure the seal ring 84 therein.

The second seal member 80 is axially adjustable between open and closed positions. In the closed position (FIG. 1), seal member 80 is adjusted toward the second chamber 32 so that the ring seal 84 contacts a step surface 22 of the shaft 20. For example, the step surface 22 can be a shoulder or sleeve on the shaft 20 that extends substantially radially outward therefrom. An outer radial surface 81 of the second seal member 80 is sealed with the housing 16 by an annular seal devices 120b. The outer radial surface 81, and the seal device 120b, can be prevent the flow of fluid between the outer surface 81 and the housing 16 so that the opposite sides of the seal member 80 can be exposed to different fluid pressures, which can actuate the movement of the seal member 80. The ring seal 80 is biased to the closed position by a spring 100 or other mechanical bias member, and the seal ring 84 and the step surface 22 can substantially prevent the flow of fluid through the passage 94 in the closed position. The seal ring 84 can be adjusted to the open position (FIG. 2), i.e., toward the first seal member 50, by a fluid force provided by a pressurized barrier fluid in the second chamber 32. In the second position, the seal ring 84 and the step surface 22 define a space 102 therebetween. The second chamber 32 is configured to receive the barrier fluid through a passage 38 that extends through the housing 16 to a pressurized source, e.g., a vessel of pressurized fluid or a device for pressurizing the fluid.

Figure 2:
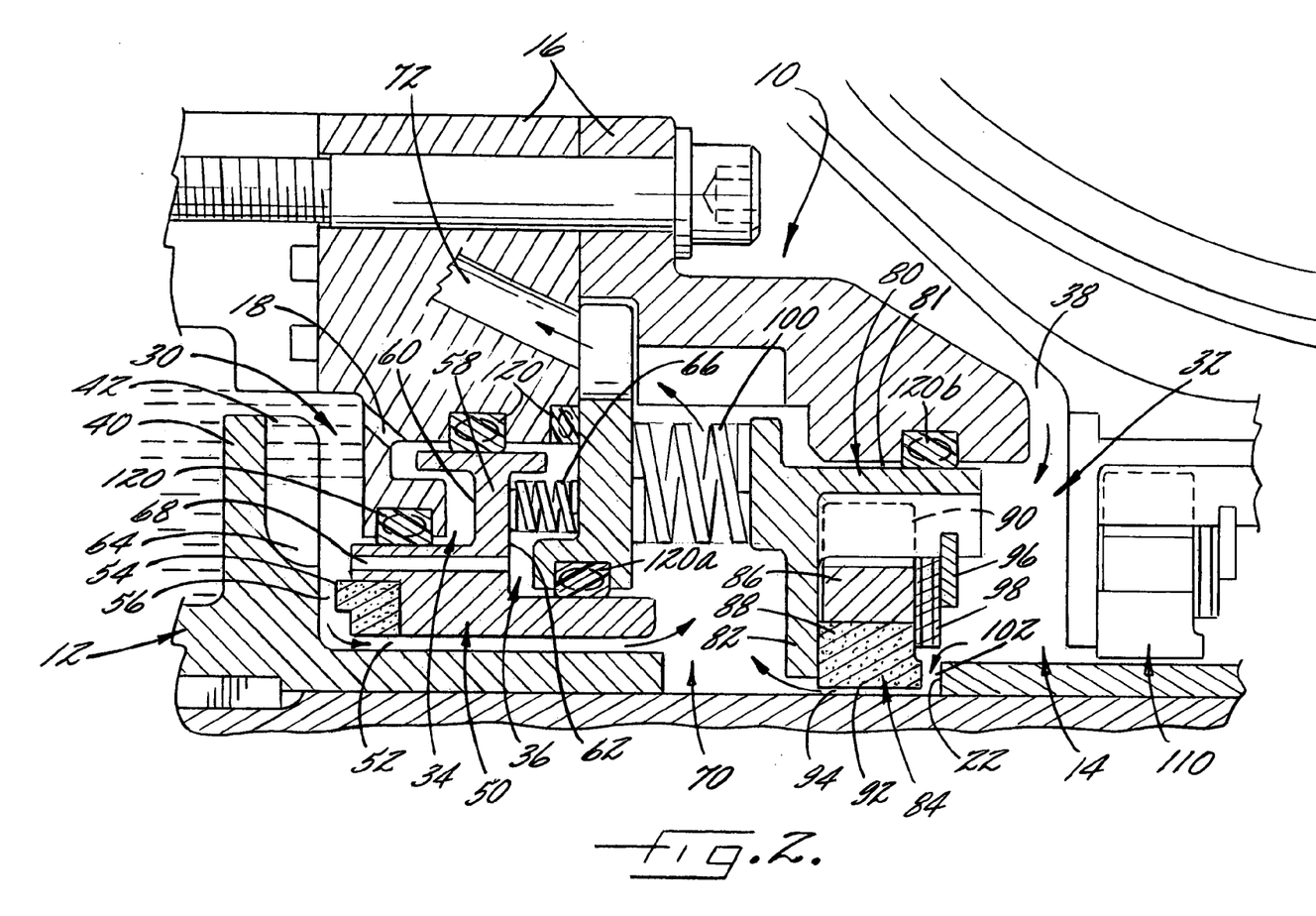
FIG. 2 is a section view illustrating the shaft seal assembly of FIG. 1 with the first and second seal members in open positions.

The pressurized fluid can also flow from the second chamber 32 in a direction opposite the seal member 80, e.g., toward the turbine of the turbopump at the second side of the assembly 10. For example, a turbine seal 110 can be provided to prevent the flow of fluids from the turbine into the second chamber 32. The turbine seal 110 can be a conventional seal or a seal similar to one of those described herein. Typically, the turbine seal 110 is a clearance seal, and the barrier fluid can be supplied to the second chamber 32 during operation of the turbopump so that the barrier fluid flows through the clearance of the turbine seal 110 and prevents the flow of fluids from the turbine from entering the chamber 32. In addition, the barrier fluid can be selected according to the fluids flowing in the turbine so that the addition of the barrier fluid to the turbine does not negatively impact the operation of the turbine. The barrier fluid can be provided as a liquid or gas and, in some cases, the barrier can include inert fluids such as helium, nitrogen, and/or argon. In any case, a valve or other control mechanism can be disposed between the barrier fluid source and the second chamber 32 so that the control mechanism can adjust the flow and/or pressure of the barrier fluid provided to the chamber 32.

O-rings or other annular seal devices 120 (including 120a and 120b) can be provided at various locations throughout the seal assembly such as between the seal members 50, 80 and the housing 16 to prevent leakage to or from the various fluid chambers 30, 32, 34, 36, 70. For example, the annular seal devices 120 can be OmniSeal® seals, a registered trademark of Saint-Gobain Performance Plastics Corp. of Wayne, N.J.

As described herein, the seal assembly 10 can maintain a seal between the first and second chambers 30, 32 during various modes of operation. Typically, when the shaft 20 is stationary or rotating at a slow speed, the first and second seal members 50, 80 are adjusted to the closed positions. That is, the first seal member 50 is adjusted axially toward the first chamber 30 so that the seal dam 54 contacts the slinger 40 and forms a seal therewith to prevent fluid in the first chamber 30 from flowing through the passage 52. The second seal member 80 is adjusted toward the second chamber 32 so that the inner ring 88 contacts the step surface 22 of the shaft 20 and forms a seal therewith so that contaminants cannot migrate from drain 70 into chamber 32. As the rotational speed on the shaft 20 increases, the radial pressure gradient in the first chamber 30 increases and the first seal member 50 opens so that the seal dam 54 does not contact the rotating slinger 40. Further, the pressure of the barrier fluid in the second chamber 32 can be increased, e.g., by automatically adjusting a valve to connect the source of the barrier fluid to the second chamber 32, thereby adjusting the seal ring 84 away from the step surface 22. While the figures illustrate only open and closed positions, it is appreciated that the seal members 50, 80 can be adjusted throughout a range of positions, i.e., the members 50, 80 can be adjusted to various positions according to the operation mode of the assembly 10 and the device for which the assembly is used for sealing.

By adjusting the first and second seal members 50, 80 away from the slinger 40 and the step surface 22 during some modes of operation, wear of those components can be reduced. Further, frictional heat generation can also be reduced. By closing the seal members 50, 80 when the shaft 20 is not rotating and/or when the shaft 20 is rotating slowly, an effective seal can be maintained between the first and second chambers 30, 32. Thus, a flow of the fluid from the first chamber 30 to the drain 70 and a flow of the barrier fluid to the drain 70 can be reduced.

Figure 3:
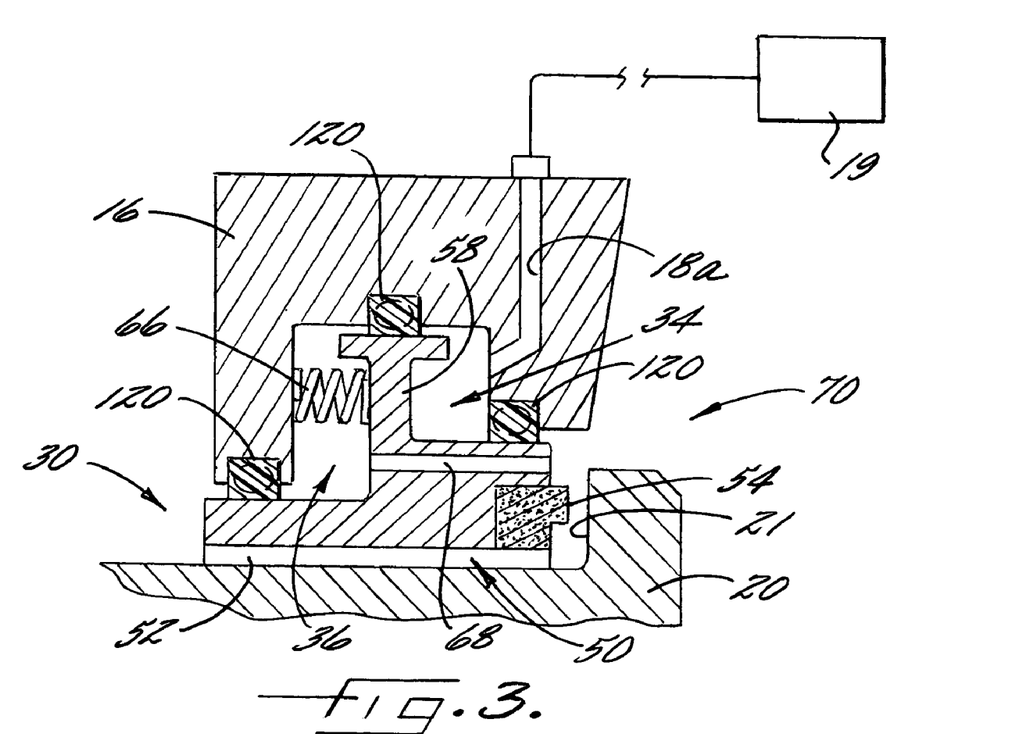
FIG. 3 is a section view illustrating a pressure-actuated shaft seal assembly for controlling the flow of fluids along a shaft according to another embodiment of the present invention, shown in an open position.

In other embodiments of the present invention, the seal members 50, 80 can be configured to be adjusted in other manners during operation of the seal assembly 10. For example, as shown in FIG. 3, the first seal member 50 is configured between two chambers such as the first chamber 30 and the drain 70, and the seal member 50 is configured to be adjusted in a direction from the first chamber 30 toward the drain 70 to close the passage 52, and in an opposite direction from the drain 70 toward the first chamber 30 to open the passage 52. That is, the shaft 20 defines a surface 21 extending radially outward and directed toward the seal member 50, and the seal dam 54 of the seal member 50 is configured to contact and form a seal with the surface 21. As described above in connection with FIGS. 1 and 2, the housing and seal member 50 cooperatively define third and fourth chambers 34, 36. As illustrated in FIG. 3, the fourth chamber 36 is fluidly connected by the port 68 to the drain 70, and the third chamber 34 is fluidly connected by a port 18a through the housing 16 to a fluid source 19. The fluid source 19 is configured to provide a variable pressure for controlling the adjustment of the seal member 50. Thus, with a relatively low pressure applied by the source 19 to the third chamber 34, the seal member 50 is adjusted to the closed position, e.g., by a force provided by the spring 66 and/or a pressure provided through port 68. With the seal member 50 in the closed position, the seal dam 54 seals against the surface 21, substantially preventing the flow of fluid through the passage 52. However, when a relatively high pressure is provided by the source 19, the force of the spring 66 and/or the force provided by the fluid in chamber 36 is overcome, and the seal member 50 is adjusted to an open position in which fluid can flow through the passage 52.

The assembly 10 can include additional seal members, such as the seal member 80 described above. Further, it is appreciated that the seal assembly 10 can include either of the first and second seal members 50, 80 of the foregoing embodiments individually. Alternatively, the various embodiments of the seal assembly 10 can include additional seals similar to the seal members 50, 80 or other types of seals.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A pressure-actuated shaft seal assembly for controlling the flow of a fluid adjacent a rotatable shaft between first and second fluid chambers of the assembly, the seal assembly comprising:
    a first seal member extending circumferentially around the rotatable shaft to define a fluid passage between the seal member and the shaft, the seal member being adjustable in an axial direction between open and closed positions, the seal member in the open position configured to define a space fluidly connecting the first fluid chamber to the passage between the seal member and the shaft, and the seal member in the closed position configured to close the space to substantially seal the fluid passage and prevent the fluid from flowing from the first chamber of the assembly through the passage; and
    a housing extending circumferentially around the shaft and extending between the first and second fluid chambers, the housing being configured to at least partially receive the first seal member such that the housing defines third and fourth fluid chambers on opposite sides of a portion of the first seal member;
    wherein the third and fourth chambers are fluidly connected to first and second fluid sources, respectively, such that the seal member is configured to be adjusted axially between the open and closed positions by a pressure differential between the first and second fluid sources.

2. A seal assembly according to claim 1 wherein the fourth chamber is fluidly connected to the first fluid chamber and defined at least partially by a surface of the first seal member opposite the first chamber such that fluid in the fourth chamber exerts a force to urge the seal member toward the first chamber.

3. A seal assembly according to claim 1 wherein the third and fourth fluid chambers are connected to the first fluid chamber at dissimilar radial positions such that the pressure differential corresponds to a radial pressure gradient in the first fluid chamber.

4. A seal assembly according to claim 3 wherein the housing defines a first port fluidly connecting the third chamber to the first chamber at a first radial position and the seal member defines a second port fluidly connecting the fourth chamber to the first chamber at a second radial position, the second radial position being radially inward relative to the first radial position.

5. A seal assembly according to claim 3 further comprising a slinger in the first chamber, the slinger connected to the shaft and configured to rotate the fluid in the first chamber as the shaft rotates, thereby forming a radial pressure gradient in the first fluid chamber corresponding to a rotational speed of the shaft.

6. A seal assembly according to claim 1 further comprising a mechanical bias member configured to bias the first seal member to the closed position.

7. A seal assembly according to claim 1 wherein the first seal member in the closed position is configured to axially contact a rotatable member connected to the shaft to thereby close the space connecting the first fluid chamber to the passage.

8. A seal assembly according to claim 1 wherein the housing defines third and fourth fluid chambers on opposite sides of a portion of the first seal member, the opposite sides of the portion of the first seal member defining dissimilar areas in the third and fourth chambers, respectively.

9. A seal assembly according to claim 1 wherein the housing defines third and fourth fluid chambers on opposite sides of a portion of the first seal member, the third chamber being fluidly connected to a fluid source, the fluid source configured to provide a fluid with a pressure corresponding to the speed of the shaft.

10. A seal assembly according to claim 1 wherein the housing defines third and fourth fluid chambers on opposite sides of a portion of the first seal member, the third chamber being fluidly connected to a fluid source, the fluid source configured to provide a fluid with a pressure controlled independently of the speed of the shaft.

11. A seal assembly according to claim 1, further comprising:
    a second seal member extending circumferentially around the rotatable shaft and proximate to the shaft to define a fluid passage between the second seal member and the shaft, the second seal member having a first side directed toward the first seal member and an opposite second side directed toward a step surface extending generally radially outward from the shaft, the second seal member being adjustable in an axial direction between open and closed positions such that the second seal member in the open position is configured to define a space between the second side of the second seal member and the step surface, and the second seal member in the closed position is configured to contact the step surface to close the space;

a barrier fluid passage at the second side of the second seal member and configured to be selectively fluidly connected to a source of pressurized barrier fluid to transmit the barrier fluid to the second seal member, the second seal member being configured to be adjusted to the open position by a pressure of the barrier fluid in the barrier fluid passage; and a mechanical bias member configured to bias the second seal member toward the step surface such that the mechanical bias member adjusts the second seal member to the closed position when the source of pressurized barrier fluid is disconnected from the barrier fluid passage to thereby close the space and substantially seal the fluid passage between the second seal member and the shaft to prevent fluid from flowing therethrough, wherein the housing defines a drain disposed between the first and second seal members, the drain being configured to receive fluid from the passages of the seal members.

12. A seal assembly according to claim 11 wherein the second seal member defines a surface directed toward the shaft and at least partially defining the fluid passage between the second seal member and the shaft, the surface being disposed proximate to the shaft such that the barrier fluid flows therethrough at a controlled rate when the second seal member is in the open position.

13. A seal assembly according to claim 11 wherein the second seal member is configured to adjust to the open position in a direction away from the second chamber when the barrier fluid is provided to the second chamber at a predetermined minimum pressure.

14. A seal assembly according to claim 11 wherein the second seal member is a substantially rigid member configured to adjust between the open and closed positions without significant deformation.

15. A pressure-actuated shaft seal assembly for controlling the flow of a fluid adjacent a rotatable shaft between first and second fluid chambers of the assembly, the seal assembly comprising:

a first seal member extending circumferentially around the rotatable shaft to define a fluid passage between the first seal member and the shaft, the first seal member being adjustable in an axial direction between open and closed positions, the first seal member in the open position configured to define a space fluidly connecting the first fluid chamber to the passage between the first seal member and the shaft, and the first seal member in the closed position configured to close the space to substantially seal the fluid passage and prevent the fluid from flowing from the first chamber of the assembly through the passage;

a second seal member extending circumferentially around the rotatable shaft and proximate to the shaft to define a fluid passage between the second seal member and the shaft, the second seal member having a first side directed toward the first fluid chamber, an opposite second side directed toward a step surface extending generally radially outward from the shaft, and an outer surface directed radially outward from the shaft, the second seal member being adjustable in an axial direction between open and closed positions such that the second seal member in the open position is configured to define a space between the second side of the second seal member and the step surface, and the second seal member in the closed position is configured to contact the step surface to close the space;

a housing extending circumferentially around the shaft and extending between the first and second fluid chambers, the housing defining a barrier fluid passage at the second side of the second seal member and configured to be selectively fluidly connected to a source of pressurized barrier fluid to transmit the barrier fluid to the second seal member such that the second seal member is configured to be adjusted to the open position by a pressure of the barrier fluid in the barrier fluid passage, the housing being configured to at least partially receive the first seal member such that the housing defines third and fourth fluid chambers on opposite sides of a portion of the first seal member, wherein the third and fourth chambers are fluidly connected to first and second fluid sources, respectively, such that the first seal member is configured to be adjusted axially between the open and closed positions by a pressure differential between the first and second fluid sources;

a sealing ring disposed between the outer surface of the second seal member and the housing, the sealing ring being configured to substantially prevent the flow of fluid between the outer surface of the second seal member and the housing; and a mechanical bias member configured to bias the second seal member toward the step surface such that the mechanical bias member adjusts the second seal member to the closed position when the source of pressurized barrier fluid is disconnected from the barrier fluid passage to thereby close the space and substantially seal the fluid passage between the second seal member and the shaft to prevent fluid from flowing therethrough.

16. A seal assembly according to claim 15 wherein the second seal member defines a surface directed toward the shaft and at least partially defining the fluid passage between the second seal member and the shaft, the surface being disposed proximate to the shaft such that the barrier fluid flows therethrough at a controlled rate when the second seal member is in the open position.

17. A seal assembly according to claim 15 wherein the second seal member is configured to adjust to the open position in a direction away from the second chamber when the barrier fluid is provided to the second chamber at a predetermined minimum pressure.

18. A seal assembly according to claim 15 wherein the second seal member is a substantially rigid member configured to adjust between the open and closed positions without significant deformation.

19. A method of controlling the flow of a fluid adjacent a rotatable shaft between first and second fluid chambers on opposite sides of a pressure-actuated shaft seal assembly, the method comprising:

providing a housing extending circumferentially around the shaft and extending between the first and second fluid chambers;

providing a first seal member at least partially in the housing such that the housing defines third and fourth fluid chambers on opposite sides of a portion of the first seal member, the first seal member being adjustable in an axial direction between open and closed positions, the first seal member in the open position configured to define a space fluidly connecting the first fluid chamber to a fluid passage extending between the first seal member and the shaft, and the first seal member in the closed position configured to close the space to substantially seal the fluid passage and prevent the fluid from flowing through the passage; and selectively providing fluid to the third and fourth chambers and thereby adjusting the first seal member axially between the open and closed positions.

20. A method according to claim 19 wherein said selectively providing step comprises providing the fluid from the first fluid chamber to the fourth fluid chamber such that the fluid in the fourth chamber exerts a force to urge the seal member toward the first chamber.

21. A method according to claim 19 said selectively providing step comprises providing the fluid from the first fluid chamber to the third and fourth fluid chambers, the fluid flowing to the third and fourth chambers from dissimilar radial positions in the first fluid chamber such that a pressure differential in the third and fourth chambers corresponds to a radial pressure gradient in the first fluid chamber.

22. A method according to claim 19 wherein said selectively providing step comprises rotating the fluid in the first fluid chamber with the shaft and thereby forming a radial pressure gradient in the first fluid chamber corresponding to a rotational speed of the shaft.

23. A method according to claim 19 further comprising biasing the first seal member to the closed position with a mechanical bias member.

24. A method according to claim 19 wherein said selective providing step comprises axially adjusting the first seal member against a rotatable member connected to the shaft to thereby close the space connecting the first fluid chamber to the passage.

25. A method according to claim 19 wherein said selective providing step comprises fluidly connecting a fluid source to the third chamber, the fluid source configured to provide a fluid with a pressure corresponding to the speed of the shaft.

26. A method according to claim 19 wherein said selective providing step comprises fluidly connecting a fluid source to the third chamber, the fluid source configured to provide a fluid with a pressure controlled independently of the speed of the shaft.

27. A method according to claim 19, further comprising:
providing a second seal member adjustable in an axial direction between open and closed positions, the second seal member having a first side directed toward the first seal member and an opposite second side directed toward a step surface extending generally radially outward from the shaft, the second seal member being adjustable in an axial direction between open and closed positions such that the second seal member in the open position is configured to define a space between the second side of the second seal member and the step surface, and the second seal member in the closed position is configured to contact the step surface to close the space;

selectively fluidly connecting a source of pressurized barrier fluid to the second chamber to transmit the barrier fluid to the second seal member and thereby adjust the second seal member to the open position such that the barrier fluid flows through the passage between the second seal member and the shaft; and biasing the second seal member toward the step surface with a mechanical bias member such that the mechanical bias member adjusts the second seal member to the closed position when the source of pressurized barrier fluid is disconnected from the second chamber to thereby close the space between the second seal member and the step surface and substantially seal the fluid passage between the second seal member and the shaft to prevent fluid from flowing therethrough; and receiving fluid flowing through the passages of the first and second seal members to a drain between the first and second seal members.

28. A method according to claim 27, further comprising providing the second seal member as a substantially rigid member configured to adjust between the open and closed positions without significant deformation.

29. A method according to claim 19, further comprising receiving fluid flowing through the passages of the first and second seal members to a drain between the first and second seal members.

30. A method according to claim 19, further comprising:
providing a second seal member adjustable in an axial direction between open and closed positions, the second seal member having a first side directed toward the first seal member and an opposite second side directed toward a step surface extending generally radially outward from the shaft, the second seal member being adjustable in an axial direction between open and closed positions such that the second seal member in the open position is configured to define a space between the second side of the second seal member and the step surface, and the second seal member in the closed position is configured to contact the step surface to close the space;

selectively fluidly connecting a source of pressurized barrier fluid to the second chamber to transmit the barrier fluid to the second seal member and thereby adjust the second seal member to the open position such that the barrier fluid flows through the passage between the second seal member and the shaft; and biasing the second seal member toward the step surface with a mechanical bias member such that the mechanical bias member adjusts the second seal member to the closed position when the source of pressurized barrier fluid is disconnected from the second chamber to thereby close the space between the second seal member and the step surface and substantially seal the fluid passage between the second seal member and the shaft to prevent fluid from flowing therethrough.

31. A method of controlling the flow of a fluid adjacent a rotatable shaft between first and second fluid chambers on opposite sides of a pressure-actuated shaft seal assembly, the method comprising:
providing a housing extending circumferentially around the shaft and extending between the first and second fluid chambers;

providing a seal member at least partially in the housing such that the housing defines third and fourth fluid chambers on opposite sides of a portion of the first seal member, the first seal member extending circumferentially around the rotatable shaft and proximate to the shaft to define a fluid passage between the seal member and the shaft, the seal member having a first side directed toward the first fluid chamber, an opposite second side directed toward a step surface extending generally radially outward from the shaft, and an outer surface directed radially outward from the shaft, the seal member being adjustable in an axial direction between open and closed positions such that the seal member in the open position is configured to define a space between the second side of the seal member and the step surface, and the seal member in the closed position is configured to contact the step surface to close the space;

selectively fluidly connecting a source of pressurized barrier fluid to the second chamber to transmit the barrier fluid to the seal member and thereby adjust the seal member to the open position such that the barrier fluid flows through the passage between the seal member and the shaft;

biasing the seal member toward the step surface with a mechanical bias member such that the mechanical bias member adjusts the seal member to the closed position when the source of pressurized barrier fluid is disconnected from the second chamber to thereby close the space between the seal member and the step surface and substantially seal the fluid passage between the seal member and the shaft to prevent fluid from flowing therethrough; and receiving fluid flowing through the fluid passage between the seal member and the shaft to a drain extending through the housing from the first chamber.

32. A method according to claim 31, further comprising providing the seal member as a substantially rigid member configured to adjust between the open and closed positions without significant deformation.

33. A method of controlling the flow of a fluid adjacent a rotatable shaft between first and second fluid chambers on opposite sides of a pressure-actuated shaft seal assembly, the method comprising:

providing a first seal member being adjustable in an axial direction between open and closed positions, the first seal member in the open position configured to define a space fluidly connecting the first fluid chamber to a fluid passage extending between the first seal member and the shaft, and the first seal member in the closed position configured to close the space to substantially seal the fluid passage and prevent the fluid from flowing through the passage; and selectively providing fluid from the first chamber to third and fourth fluid chambers on opposite sides of a portion of the first seal member, the fluid flowing to the third and fourth chambers from dissimilar radial positions in the first fluid chamber such that a pressure differential in the third and fourth chambers corresponds to a radial pressure gradient in the first fluid chamber, thereby adjusting the first seal member axially between the open and closed positions.

34. A method of controlling the flow of a fluid adjacent a rotatable shaft between first and second fluid chambers on opposite sides of a pressure-actuated shaft seal assembly, the method comprising:

providing a first seal member being adjustable in an axial direction between open and closed positions, the first seal member in the open position configured to define a space fluidly connecting the first fluid chamber to a fluid passage extending between the first seal member and the shaft, and the first seal member in the closed position configured to close the space to substantially seal the fluid passage and prevent the fluid from flowing through the passage;

selectively providing fluid to third and fourth chambers on opposite sides of a portion of the first seal member and thereby adjusting the first seal member axially between the open and closed positions; and receiving fluid flowing through the passages of the first and second seal members to a drain between the first and second seal members.

* * * * *